UNITED STATES PATENT OFFICE.

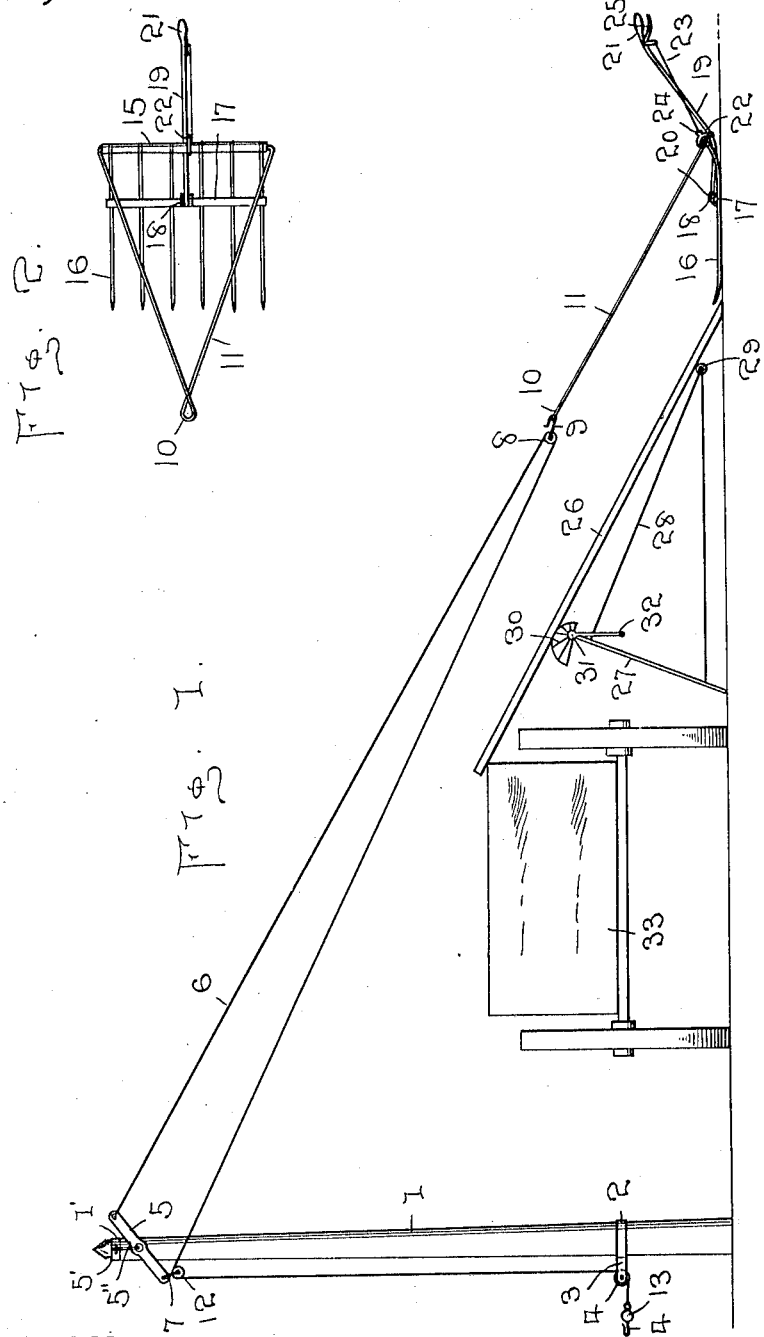

CHARLES E. JOHNSON, OF DEGRAFF, OHIO, ASSIGNOR OF ONE-HALF TO WILLIAM H. HINKLE, OF DEGRAFF, OHIO.

LOADING ATTACHMENT FOR MANURE-SPREADERS.

1,022,088.  Specification of Letters Patent.  Patented Apr. 2, 1912.

Application filed October 14, 1911. Serial No. 654,584.

*To all whom it may concern:*

Be it known that I, CHARLES E. JOHNSON, citizen of the United States, residing at Degraff, in the county of Logan and State of Ohio, have invented certain new and useful Improvements in Loading Attachments for Manure-Spreaders; and I do hereby declare the following to be a full, clear, and exact description of the invention, such as will enable others skilled in the art to which it appertains to make and use the same.

This invention relates to loading mechanism, and more particularly to loading mechanism for manure spreaders, wagons, etc.

An object of the invention is to provide mechanism by means of which manure, dirt, etc., may be readily loaded upon a spreader or the like.

Another object is to produce a device of this character which will effectively gather the material to be loaded and load the same upon the spreader.

Another object is to produce loading mechanism of this character which will gather the material from the field and load said material without requiring the service of more than one workman.

Other objects and advantages will be hereinafter pointed out in the specification and claims.

In the accompanying drawings which are made a part of this application, Figure 1, is an elevational view of the loading mechanism in position for loading material upon the spreader, the spreader being shown at the upper end of the slide to receive the material, and Fig. 2, is a detail plan view of the fork detached.

Referring more particularly to the drawings in which similar reference numerals designate corresponding parts throughout the several views, 1 represents a post which may be either temporarily or permanently positioned at a suitable point upon the ground from which it is desired to gather the material to be loaded upon the spreader or wagon. Secured around this post, near the ground is a suitable bracket 2 having the extended arms 3 between which is positioned a grooved roller or pulley 4 the purpose of which will presently appear. Near the upper end of the post 1 is a circular shoulder 1' against which rests the ring 5' working around the upper end of the post 1 and adapted for free movement thereover, said ring 5' carrying a link 5" to which is connected the arm 5, said arm being pivoted to the link at about the center of the arm, and has its extremities perforated to receive one end of the rope or cable 6 and the link 7, the rope being secured in one perforated extremity while the link is secured in the other.

The rope or cable 6 passes around the pulley wheel 8 carried by the hook 9 which is adapted for engagement with the small or loop portion 10 of the substantially V-shape fork engaging and dragging wire clamp 11. After passing around the pulley 8, the rope 6 is carried back toward the upper end of the post 1 and passed around the pulley wheel 12 carried in the link 7. The rope 6 is then passed downwardly adjacent the post 1 and around the pulley wheel or groove roller 4 and finally connected with the swingletree 13 which may carry any suitable form of clevis 14, by means of which suitable draft animals may be connected to the rope or cable 6 for operating the loading mechanism.

The wire clamp 11 has the free ends of the long diverging arms thereof bent toward one another for engagement with the ends of the hollow tubing or pipe 15, around which the inner ends of the tines 16 are engaged, it being understood that the bent ends of the wire clamp 11 clamp within the open ends of said tubing 15, thus holding said tubing against rotation. It will be evident, however, that the inner ends of the tines 16 may be fastened to the tubing 15 in any preferred manner.

A short distance from the tubing 15 and positioned parallel therewith is the connecting bar and strengthening bar 17, to the under side of which are secured the tines 16, thus connecting and strengthening said tines. This is specially needed when the inner ends of the tines 16 are simply engaged around the tubing 15. Positioned centrally of the bar 17 are the parallel perforated ears 18 which are secured in any suitable manner to said bar and project therefrom. Between the ears 18 is the forward end of the fork handle 19 and a pin 20 is passed through the perforated ears 18 and through the forward end of said handle, the rear end thereof, extending rearwardly for some distance beyond the tubing 15.

The lever 19 is preferably of such form and curvature as to avoid the tubing 15, said handle passing therebeneath and the rearward end 21 assuming a position sufficiently above the ground, when the tines 16 are resting thereupon, to be within ready grasp of the operator or workman.

Pivoted to the handle 19 is one end of the curved or bell crank latch 22 which is adapted to be normally engaged over the tubing 15. This latch or bell crank 22 is adapted to be drawn away from the tubing 15 by means of the wire 23, one end of which is connected to the lug 24 extending from the bell crank 22 while its opposite end is connected with the short end of the L-shape finger 25. The L-shape finger 25 is pivoted at its bent portion to the rear end of the handle 19, near the extremity thereof. While the curved latch or bell crank 22 is engaged over the tubing 15, the long portion of the finger 25 rests away from the upper end 21 of the handle 19 and by pressing this portion of the finger 25 against the upper end of the handle 19, the bell crank or curved latch 22 is swung upon its pivot and drawn away from the tubing 15, allowing the fork to swing upon the forward end of the handle 19, as will be clearly understood.

The proper distance from the post 1 is positioned a slide 26 which is supported in slanting position by means of the connected supporting legs 27 and the wire frame 28 extending rearwardly therefrom, the upper and lower sides of the wire frame meeting and carrying a roller 29 at the junction thereof for engagement with the under side of the side 26 near the end positioned upon the ground. Engaged on the under side of the slide 26 near the elevated end thereof, is the segmental cam wheel or roller 30 mounted upon the shaft 31 carried in the upper end of the connected legs 27, and having a handle 32 upon one end, by means of which the segmental cam 30 may be turned to the proper position to support the slide. The spreader 33, or other conveyance upon which the material is to be loaded is positioned between the posts 1 and the slide 26, preferably at such point to allow the upper end of the slide 26 to be engaged over the edge thereof.

In operation, the operator or workman grasps the upper or rear end 21 of the handle 19 and carries the fork to a point some distance from the lower end of the slide 26, it being understood that the draft animals are drawn toward the post 1, and that the rope or cable 6 rides over the pulleys, 4, 12 and 8, allowing the fork and wire clamp 11 to be moved to the position desired. As the animals move away from the post 1, the rope or cable 6 will be drawn in an opposite direction near the rollers 4, 12 and 8 and as the fork is allowed to rest with the tines 16 upon the ground, and said fork guided properly, the material will be gathered from the ground as said fork moves toward the lower end of the slide upon the ground. When the fork reaches the lower end of the slide 26 with a sufficient quantity of material upon its tines, the pull upon the rope or cable 6 is continued to draw the fork up the slide 26 until it reaches the upper edge thereof resting over the side of the spreader 33. The long portion of the finger 25 is then pressed against the upper end 21 of the handle 19 to swing the curved latch or bell crank 22 upon its pivot and release the tubing 15. The weight of the material upon the tines 16 will cause the upper ends thereof to tilt forward, said tines being assisted in this movement by the pull upon the rope or cable 6, it being evident that the full force of this strain will be continued upon the tubing 15, for the reason that the wire clamp 11 is connected with the opposite ends thereof. After the material has left the tines 16 and been deposited upon the spreader 33, the strain upon the rope or cable 6 is relieved and the animal caused to again move toward the post 1, causing a slack in the rope 6 and allowing the tines to be turned to their proper position and the fork slide downwardly upon the slide 26, at which time the long end of the finger 25 may be released so that the latch or bell crank 22 may again engage over the tubing 15 to lock the tines 16 in proper relation with the handle 19. It will be evident that this operation may be repeated until all of the material may be loaded from the field onto the conveyance and that the fork may be carried to any part of the field and caused to gather the material as it is moved along the ground.

Owing to the construction of the slide supporting means and the segmental cam 30, the slide 26 may be positioned at any slant desired for loading material upon the spreaders, wagons, etc., of various heights, and the slant of said slide may be varied during the operation of loading material upon a conveyance to raise the upper end of the slide, by simply turning the cam operating handle 32, it being understood that the cam may be held in adjusted position by any well known latching or locking means.

Owing to the extremely small number of parts of this device and the simple formation and operation thereof, it will be apparent that this loading mechanism may be manufactured and employed at a small cost and a great saving of time and labor.

What I claim is:

1. A loading mechanism comprising a post, a bracket carrying cable guiding means, said bracket being positioned near the lower end of the post, an arm pivoted at its center to the post, cable guiding means carried by one end of the arm, a clamp, a cable guiding means connected to said clamp, a swingletree, a cable having one end secured to the arm and passing over the cable guiding means and having its opposite end secured to the swingletree, a dump fork connected to said clamp, a slide for said fork, and means for supporting the slide in slanting position.

2. Loading mechanism comprising a stationary post, cable guiding means carried by the post, a cable passing over the guiding means carried by the post, a fork connected to said cable and adapted to be drawn thereby, a slide for the fork, a frame having a roller and a segmental cam for supporting the slide in slanting position, and means for releasing the upper or rear end of the fork to allow the same to swing upon the forward end of the fork handle.

In testimony whereof I have signed my name to this specification in the presence of two subscribing witnesses.

CHARLES E. JOHNSON.

Witnesses:
H. H. MILLER,
T. C. MYERS.

Copies of this patent may be obtained for five cents each, by addressing the "Commissioner of Patents, Washington, D. C."